(No Model.)
A. BERLAND.
HYDROGEN GAS GENERATOR.
No. 254,189. Patented Feb. 28, 1882.
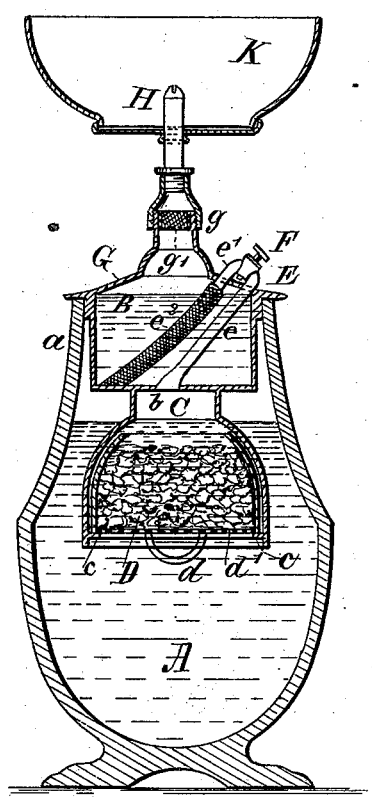
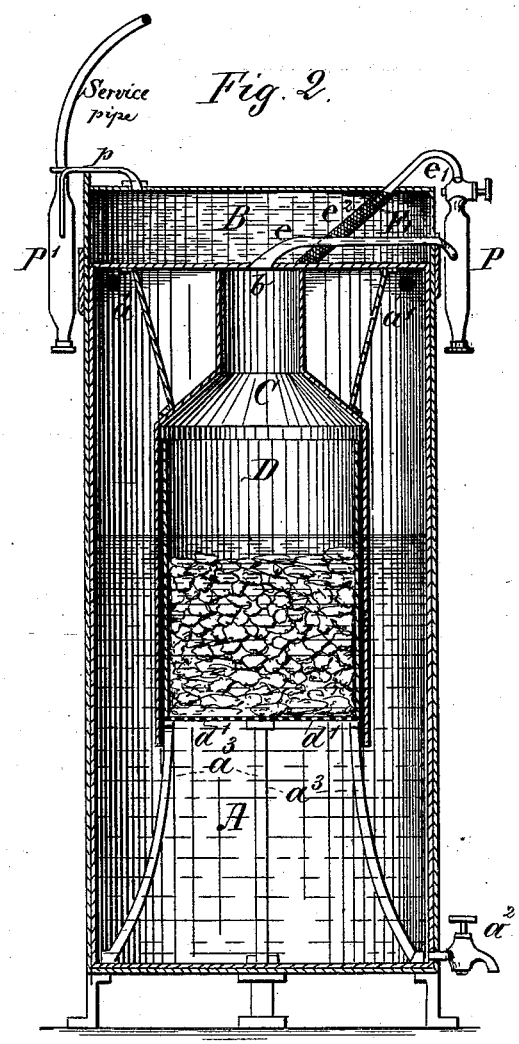
Witnesses
H. C. McElwee,
W. Burris.
Inventor
Alexandre Berland
per Henry Orth
att'y.

UNITED STATES PATENT OFFICE.

ALEXANDRE BERLAND, OF ST. PETERSBURG, RUSSIA.

HYDROGEN-GAS GENERATOR.

SPECIFICATION forming part of Letters Patent No. 254,189, dated February 28, 1882.

Application filed September 9, 1881. (No model.) Patented in France July 18, 1881.

*To all whom it may concern:*

Be it known that I, ALEXANDRE BERLAND, a citizen of Russia, residing at St. Petersburg, in the Empire of Russia, have invented new and useful Improvements in Producing Gas for Lighting Purposes, and in apparatus connected therewith, of which the following is a specification.

My invention relates to certain improvements in hydrogen-gas generators adapted for public or domestic use; and the invention consists in certain details of construction and combination of parts, substantially as hereinafter described, and set forth in the annexed claim, and as illustrated in the accompanying drawings, in which—

Figure 1 is a vertical section of a gas-generator constructed in the form of a lamp and adapted for domestic use, and Fig. 2 is a like view of a gas-generator adapted for generating and supplying gas for public or general use.

The essential features of which my improved gas-generator is composed consist of a vessel or reservoir for holding a diluted acid; a vessel or reservoir for holding zinc or iron arranged to be immersed in the acid solution to generate hydrogen gas; a vessel or reservoir for holding a volatile oil; means to conduct the hydrogen into the body of the oil for the purpose of carbureting the hydrogen gas, and means for controlling the volume of hydrogen gas delivered to the volatile oil and thence to the burner or service-pipes.

The form or shape of the various devices above described may be varied without affecting the efficiency of the apparatus, and they are constructed of materials that are not injuriously acted upon by the acid.

In the construction of the devices I employ lead or glass or porcelain, or any other material that will not be affected by the acid, except those parts that do not come in actual contact with said acid, and in their construction any suitable material may be employed.

In Fig. 1 I have shown a generator in the form of a lamp, and in which A is the vessel or reservoir or body of the lamp, made of glass, lead, porcelain, or other analogous material, to which any desired form may be given, provided it is such as to adapt it for the reception of the other parts.

The vessel A is nearly filled with diluted sulphuric acid, in the proportion of about one part of the acid and five parts of water.

Within the neck $a$ of the vessel is suspended, in any desired manner, a reservoir, B, that is open at top and is or may be filled, or nearly filled, with a volatile oil, preferably a hydrocarbon, and in practice I use petroleum essence that will vaporize at about 30° centigrade.

To the bottom of the vessel B is attached a bell, C, open at its lower end, at which point it is provided with a flange, $c$. Within the bell C is located a reservoir, D, that in outer or general form is such as to fit the interior of the bell, and is so constructed as to form, with the flange $c$ of said bell, a bayonet-joint, so that when the vessel D is introduced into the bell by giving it a partial twist by means of the handle $d$ said reservoir will be securely held in place. This reservoir is filled, or nearly filled, with zinc or pieces of iron. It is open at top and has a perforated bottom, $d'$, to which said handle $d$ is attached.

The reservoir B has in its bottom an opening, $b$, that communicates with the reservoir D, and to said opening is connected one branch, $e$, of a bent pipe, E. This branch passes out of the reservoir B, where it is bent and provided with a stop-cock, F, that serves to open or shut off the communication between said branch $e$ and the return-branch, $e'$, to which is attached a wick, $e^2$. The reservoir B is covered tightly by a cover, G, that is preferably made of copper. Said cover may be removably secured to the reservoir or permanently attached thereto. In the former case the joint between the two must be a gas-tight joint.

The cover G has a neck, $g$, within which is located a wire-gauze cylinder, $g'$, to prevent the flame of the burner H from accidentally reaching the oil-reservoir, said burner being screwed to the neck, and is or may be provided with any suitable shade or globe holder and globe, K.

The operation of this improved portable generator is as follows: The vessel A being supplied with a sufficient quantity of dilute sulphuric acid, the vessel D, with zinc or pieces of iron, and the receiver B, with essence of petroleum or other volatile oil, and all placed in position, as shown, the stop-cock F is closed. The immersion of the zinc-holder in the dilute acid causes hydrogen gas to be evolved in a very short time, when the stop-cock is opened and the gas admitted through pipe E and the tubular wick into the oil, where said gas is carbureted and escapes to the burner, which may now be lighted.

I employ the tubular wick for the purpose of more intimately mixing the gas with the hydrocarbon, as it is in this manner made to escape in minute jets through the tissue of said wick and passes into and through the oil.

Instead of a wick, very fine wire-gauze or other analogous substance may be employed. When the stop-cock F is closed to shut off the hydrogen gas from the carburetor the pressure of the gas within the bell will in a short time be sufficient to expel the acidulated liquid, and thus arrest the further generation of hydrogen gas until said stop-cock is reopened.

When the cover G is permanently attached to the carburetor or reservoir B, then I make provision for the removal of the return-branch $e'$ of the pipe, for the purpose of substituting a new wick or for cleansing said wick of any dust or dirt or sediment that may clog up its meshes. This may be accomplished in any desired manner, either by securing the branch to a plug that is screwed into the lid and coupling said branch to the branch $e$ by means of a sleeve or other suitable coupling, or this may be effected by any of the well-known means usually employed for such purposes.

It will be seen that by means of the stop-cock F the flame at the burner is controlled or the gas turned off, as above set forth. This form of portable gas-generator is simple in construction, easily managed, and not liable to get out of repair, and furnishes an excellent illuminating-gas.

For generating large volumes of gas to supply a number of burners, or for supplying districts or cities, I preferably adopt the construction shown in Fig. 2, in which A is the vessel that contains the dilute acid. Said vessel is or may be inclosed in a casing, A', that has a filling-aperture, $a'$, and a discharge-cock, $a^2$.

Within the vessel is a suitable stand or support, $a^3$, upon which is placed the zinc-holder D, that is surrounded by the bell C, attached to the bottom of the oil-reservoir B.

The branch $e$ of the pipe E is here connected with any of the well-known purifiers, P, that has a discharge-plug at one end, and a stop-cock, F, at that end to which the return-branch $e'$ of the pipe E is coupled, said return-pipe carrying the wick $e^2$.

The oil reservoir or carburetor is closed gas-tight, and is provided with a discharge-pipe, $p$, that conducts the carbureted hydrogen gas to a second purifier, P', from which the purified gas is conducted to the service pipe or pipes.

The purifiers P P', here referred to, are simply condensing-vessels, and are employed for condensing the aqueous vapors generated, and eliminate the same from the gas.

The operation of this form of apparatus is substantially the same as that first above described, and it differs from the latter only in size and in the use of the purifiers, which are necessary when large quantities of gas are to be generated.

I have represented the vessel A, the zinc-holder D, the bell C, and oil reservoir or carburetor B of the large apparatus as of cylindrical form, which I found to be the most convenient, though any other desired form may be given to them.

I am aware that portable hydrogen-gas generators are not new and that in such apparatus means for generating and carbureting the gas, approximately such as hereinbefore described, have heretofore been used; and I do not desire to claim these broadly, as the invention consists essentially in the arrangement and combination of the several elements of which the apparatus is composed to produce better results than those heretofore obtained, as clearly defined by the annexed claim.

Having now described my invention, what I claim is—

In a hydrogen-gas generator, the combination of the acid-reservoir A, carrying the burner, the carbureting-chamber B, arranged below said burner and carrying the inverted bell C, the zinc-holder D, provided with a perforated bottom and supported by and arranged within said bell, the two-branch pipe E, having stop-cock F, and the tubular wick $e^2$, all combined, constructed, and arranged for operation substantially as and for the purpose specified.

In witness that I claim the foregoing I have hereunto set my hand this 6th day of August, 1881.

ALEXANDRE BERLAND.

Witnesses:
NICOLAS BACH,
ILIJA PÉRÉBINOSSOFF.